(12) United States Patent
Gbadeyan et al.

(10) Patent No.: US 11,522,428 B2
(45) Date of Patent: Dec. 6, 2022

(54) ELECTRIC MACHINE WITH WINDING CONDUCTORS OF NON-UNIFORM SHAPE

(71) Applicant: ROLLS-ROYCE plc, London (GB)

(72) Inventors: Adegoke Gbadeyan, Derby (GB); Ellis F H Chong, Derby (GB)

(73) Assignee: ROLLS-ROYCE PLC, London (GB)

( * ) Notice: Subject to any disclaimer, the term of this patent is extended or adjusted under 35 U.S.C. 154(b) by 166 days.

(21) Appl. No.: 16/862,845

(22) Filed: Apr. 30, 2020

(65) Prior Publication Data

US 2020/0358345 A1 Nov. 12, 2020

(30) Foreign Application Priority Data

May 8, 2019 (GB) ...................................... 1906455

(51) Int. Cl.
*H02K 21/22* (2006.01)
*H02K 1/27* (2022.01)
*H02K 1/2786* (2022.01)

(52) U.S. Cl.
CPC ........... *H02K 21/22* (2013.01); *H02K 1/2786* (2013.01)

(58) Field of Classification Search
CPC .. H02K 21/22; H02K 1/2786; H02K 2201/06; H02K 1/165; H02K 1/27; H02K 3/14; H02K 3/28; H02K 3/47; H02K 1/30
USPC ......................................................... 310/153
See application file for complete search history.

(56) References Cited

U.S. PATENT DOCUMENTS

| | | | |
|---|---|---|---|
| 4,968,911 A | 11/1990 | Denk | |
| 6,858,962 B2 | 2/2005 | Post | |
| 7,709,987 B2 * | 5/2010 | Watanabe | ............ H02K 1/2786 310/156.28 |
| 7,847,459 B2 * | 12/2010 | Kihara | ................. H02K 1/2786 310/156.01 |
| 9,787,154 B2 | 10/2017 | Williams | |
| 10,256,689 B2 | 4/2019 | Williams | |
| 2003/0071532 A1 | 4/2003 | Post | |

(Continued)

FOREIGN PATENT DOCUMENTS

| CN | 104184290 A | 12/2014 |
|---|---|---|
| CN | 104201854 A | 12/2014 |

(Continued)

OTHER PUBLICATIONS

Machine Translation CN 108808907 A (Year: 2018).*

(Continued)

*Primary Examiner* — John K Kim
(74) *Attorney, Agent, or Firm* — Oliff PLC

(57) ABSTRACT

A radial flux rotary electric machine having an exterior-rotor configuration is shown. The machine has a permanent-magnet rotor comprising permanent magnets in a Halbach array, and an air-cored stator interior to the rotor having teeth defining tapered slots and distributed windings around the teeth to form coils in a double-layer arrangement, the windings being comprised of a plurality of phase windings. For each tooth T having a slot S1 on one side thereof and a slot S2 on another side thereof, a coil side C1 of a phase winding is arranged to occupy a radially inner layer of the slot S1 and a coil side C2 of the same phase winding is arranged to occupy a radially outer layer of the slot S2, wherein the coil side C1 has a smaller circumferential dimension and a larger radial dimension than the coil side C2.

10 Claims, 4 Drawing Sheets

(56) References Cited

U.S. PATENT DOCUMENTS

| | | | |
|---|---|---|---|
| 2007/0035192 A1* | 2/2007 | Jeon | H02K 15/03 310/156.43 |
| 2008/0278016 A1* | 11/2008 | Sorachi | H02K 11/215 310/156.55 |
| 2010/0026125 A1* | 2/2010 | Hirabayashi | H02K 1/185 310/156.16 |
| 2010/0320864 A1* | 12/2010 | Rahman | H02K 3/12 310/201 |
| 2012/0169154 A1 | 7/2012 | Curodeau | |
| 2014/0333167 A1* | 11/2014 | Akamatsu | H02K 21/222 310/153 |
| 2016/0056696 A1* | 2/2016 | Ito | H02K 3/12 29/596 |
| 2016/0190881 A1* | 6/2016 | Kanatani | H02K 5/163 310/156.01 |
| 2017/0126083 A1 | 5/2017 | Williams | |
| 2018/0013328 A1 | 1/2018 | Williams | |
| 2018/0351427 A1* | 12/2018 | Kuroyanagi | H02K 15/065 |
| 2020/0052639 A1* | 2/2020 | Ishida | B60W 10/04 |
| 2020/0106338 A1* | 4/2020 | Ishida | H02K 7/12 |
| 2020/0358345 A1* | 11/2020 | Gbadeyan | H02K 3/47 |
| 2020/0403469 A1* | 12/2020 | Zhang | H02K 1/2786 |

FOREIGN PATENT DOCUMENTS

| | | | | |
|---|---|---|---|---|
| CN | 105958763 A | | 9/2016 | |
| CN | 108808907 A | * | 11/2018 | |
| DE | 20 2015 006 632 U1 | | 9/2016 | |
| DE | 102016211600 A1 | * | 12/2017 | ........... H02K 1/2786 |
| EP | 2654181 B1 | * | 3/2016 | ............. H02K 1/27 |
| EP | 3007319 A1 | * | 4/2016 | ............. H02K 15/04 |
| KR | 101843692 B1 | * | 3/2018 | ............. H02K 3/28 |
| NO | 2019/017496 A1 | | 1/2019 | |
| WO | 03/021763 A1 | | 3/2003 | |
| WO | 2015/148719 A1 | | 10/2015 | |
| WO | WO-2019017496 A1 | * | 1/2019 | ............. H02K 3/34 |

OTHER PUBLICATIONS

Machine Translation DE 102016211600 A1 (Year: 2017).*
Machine Translation KR 101843692 B1 (Year: 2018).*
Machine Translation WO 2019017496 A1 (Year: 2019).*
Search Report of the Intellectual Property Office of the United Kingdom for GB1906455.9 dated Oct. 25, 2019.
Oct. 6, 2020 extended Search Report issued in European Patent Application No. 20170587.8.

* cited by examiner

ELECTRIC MACHINE WITH WINDING CONDUCTORS OF NON-UNIFORM SHAPE

CROSS-REFERENCE TO RELATED APPLICATIONS

This specification is based upon and claims the benefit of priority from UK Patent Application Number 1906455.9 filed on 8 May 2019, the entire contents of which are incorporated herein by reference.

TECHNICAL FIELD

This disclosure relates to radial flux rotary electric machines having exterior-rotor configurations.

BACKGROUND

Existing radial flux, interior rotor permanent magnet electric machines suffer from lower than optimal power density. This is in part due to the requirement for banding to retain the permanent magnets on the rotor, which increases the magnetic airgap and thus reduces the flux that contributes to useful work. Thus the stator often requires a ferromagnetic core so as to produce sufficient power output. It is also a requirement such designs that the rotor shaft comprise a magnetic material to form a flux path for the magnets—the density of the magnetic material reduces the power to weight ratio of the machine.

SUMMARY

Accordingly, there is provided a radial flux rotary electric machine having an exterior-rotor configuration, comprising:
a permanent-magnet rotor comprising permanent magnets in a Halbach array;
an air-cored stator interior to the rotor having teeth defining tapered slots and distributed windings around the teeth to form coils in a double-layer arrangement, the windings being comprised of a plurality of phase windings;
wherein, for each tooth T having a slot S1 on one side thereof and a slot S2 on another side thereof, a coil side C1 of a phase winding is arranged to occupy a radially inner layer of the slot S1 and a coil side C2 of the same phase winding is arranged to occupy a radially outer layer of the slot S2, wherein the coil side C1 has a smaller circumferential dimension and a larger radial dimension than the coil side C2.

The use of a Halbach array in the rotor permits an air-cored stator to be used. This reduces the weight of the machine. The use of double-layer distributed windings reduces harmonics which would otherwise lead to unacceptable losses. The tapered slots improves the packing factor in the slots.

A more optimum temperature distribution across a winding is enabled by the transposing of the radial location of a phase winding's coil sides on each side of a particular tooth. In an embodiment the windings have a constant conductor cross section. In such a case, the overall resistance in the windings is constant. The coil sides occupying the radially inner layer have a narrower circumferential dimension than those on the outer layer so as to conform to the slot taper. Such a configuration may be optimal where airgap cooling is provided (to cool the radially outer winding layers) in conjunction with centre bore cooling of the stator (to cool the radially inner winding layers). A series connection of coils may be possible in this configuration, although a parallel connection of coils may be used.

In another embodiment, the conductor cross section may vary, with the coil sides in the radially inner layer in a slot having a greater cross section than the coil sides occupying the radially outer layer in a slot. In this way, the current density and thus Joule losses are reduced for the coil sides in the radially inner layer. Such a configuration may be optimal where only airgap cooling is provided, or where the cooling capacity in the centre bore is not as great as in the airgap. Different conductor cross-sections may either be enabled by use of parallel windings, or alternatively by suitable manufacturing techniques to facilitate series connection.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
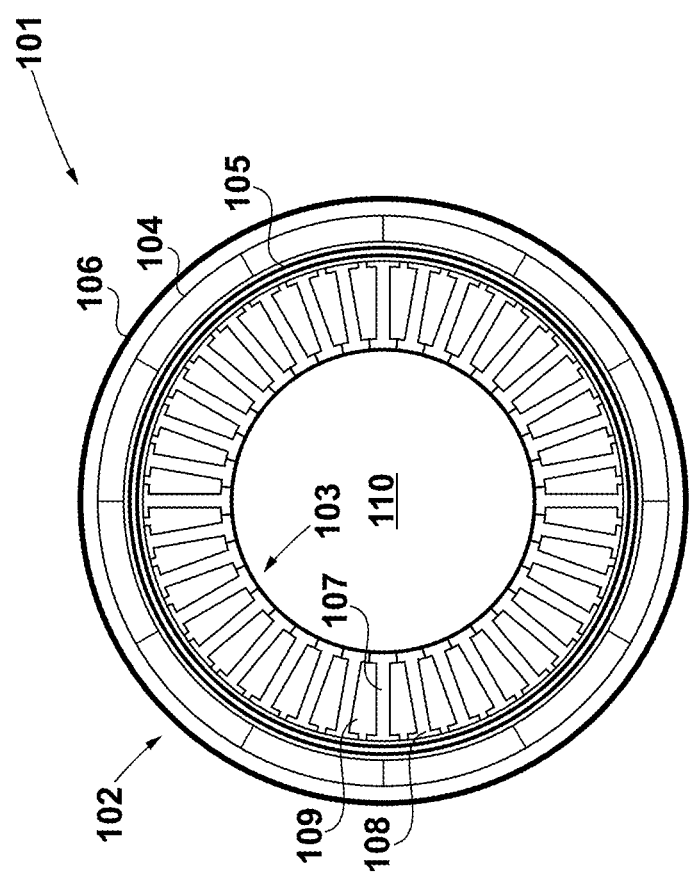
FIG. 1 shows an electric machine.

An embodiment of the invention is shown in cross section in FIG. 1.

The electric machine 101 is of a radial flux configuration. The electric machine comprises an exterior rotor 102 and an interior stator 103.

The rotor 102 comprises a plurality of permanent magnets 104 in a Halbach array. The configuration of the individual magnets will be described further with reference to FIGS. 2, 4 and 5. In the present embodiment, the permanent magnets 104 are mounted on an in-tension inner support 105. In the present embodiment, the inner support 105 comprises a composite material such as carbon fibre. Retention of the permanent magnets 104 is achieved by means of a pre-stressed outer retainer 106. In the present embodiment, the outer retainer 106 is a composite material, such as a metal matrix composite, in particular a titanium matrix composite. Alternatively a carbon fibre composite may be used.

The stator 103 is an air-cored stator, which is to say it is fully non-magnetic core. The stator core 107 in the present embodiment comprises a resin in which windings are embedded. In a specific embodiment, the resin is a polymeric resin such as an epoxy resin, polyurethane resin, etc. It will be appreciated that alternative non-magnetic core materials and/or support frames may be used. The stator core 107 forms a plurality of teeth 108 which define a plurality of tapered slots 109 therebetween. In the present example, the teeth 108 are straight teeth to form the taper in the slots 109. It will be appreciated of course that the teeth need not necessarily be straight to still have tapered slots.

In the present embodiment the stator 103 comprises a hollow centre bore 110. Those skilled in the art will be familiar with such a configuration, which is compatible with convection cooling methods.

As can be seen from the Figure, the airgap between the stator core 107 and the permanent magnets 104 need not accommodate the outer retainer 106 for the magnets. In this way, the airgap can be made shorter than interior rotor designs. This, in conjunction with the use of a Halbach array, facilitates the use of an air-cored stator. This combination of features substantially increases the power-to-weight ratio of the electric machine 101.

Figure 2:
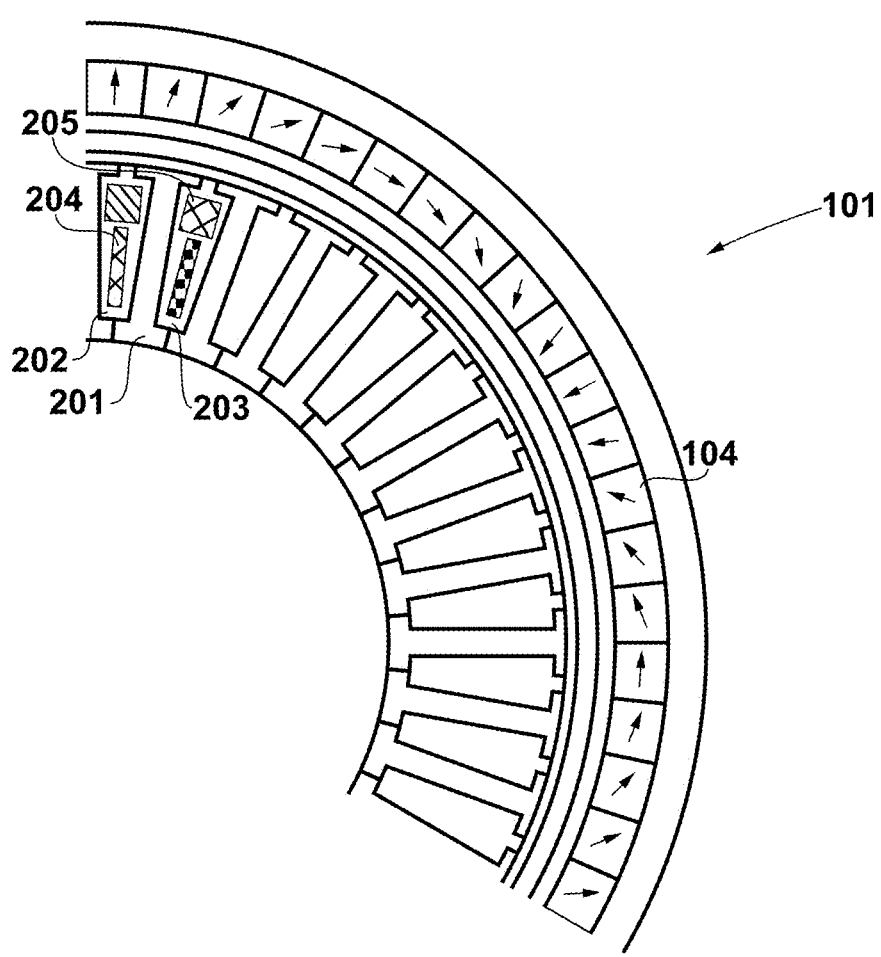
FIG. 2 shows a 120 degree arc of the electric machine of FIG. 1 in more detail.

Referring now to FIG. 2, which is an enlarged view of a 120 degree arc of the electric machine 101, the direction of magnetisation of the individual permanent magnets 104 is shown.

Also shown is a portion of the winding in the stator 103. As set out in the introduction, the electric machine 101 uses a double-layer distributed winding configuration. In the present example, the electric machine 101 is a three-phase machine. Thus, there are three phase windings. It will however be appreciated that a greater number of phases may be used depending upon the application.

As will be apparent, in a double-layer distributed winding arrangement, each slot either side of a particular tooth includes two coil sides, either from the same or different phases depending on the winding layout. In electric machine 101, for any given tooth T with a slot S1 on one side and a slot S2 on the other, there is a coil side C1 of a phase occupying a radially inner layer of the slot S1 and a coil side C2 of the same phase occupying a radially outer layer of the slot S2. In the example of FIG. 2, a tooth 201 has a slot 202 on its left hand side and slot 203 on its right hand side. The coil side 204 belonging to a phase A occupies the radially inner layer in slot 202, and the coil side 205 also belonging to phase A occupies the radially outer layer in slot 203.

Figure 3:
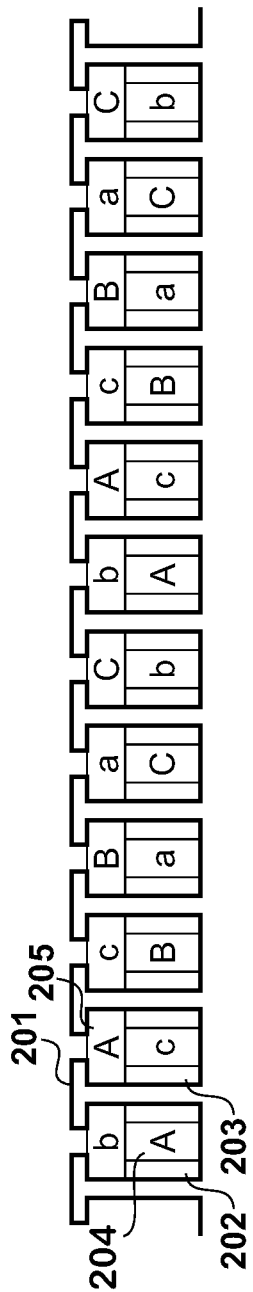
FIG. 3 shows the winding arrangement of the 120 arc of FIG. 2.

Referring now to FIG. 3, which is a winding diagram for the electric machine 101 showing phase windings A, B, and C, this configuration continues the whole way around the stator. (In FIG. 3, coil sides with phase labels in uppercase indicate a flow of current out of the page, and coil sides with phase labels in lowercase indicate a flow of current into the page.)

Referring again to FIG. 2, it will be noted that the coil side 204 has a smaller circumferential dimension and a larger radial dimension than the coil side 205 (whilst not shown, this is the case for the full set of coil sides and slots in electric machine 101). This permits a better packing factor in the slots than if a constant aspect ratio was used.

In the illustrated embodiment, the cross-sectional area of the windings is constant. In this way the current density is constant through the stator. In such a case it is possible to connect the windings completely in series, although parallel connections are of course possible.

In an alternative embodiment, the cross-sectional area of the radially-inner coil sides may be greater than the radially-outer coil sides. This may have advantages in terms of relaxing cooling requirements in the centre bore 110 of the stator 103.

In another alternative embodiment, the cross-sectional area of the radially-outer coil sides may be greater than the radially-inner coil sides. This may have advantages in terms of relaxing cooling requirements in the airgap between the stator 103 and the rotor 102.

In such implementations, it may be preferable to connect the coil sides in parallel.

Alternatively, it is possible to employ conductors with variable cross-sectional area.

The use of an air-cored stator exposes the windings to the full field produced by the Halbach arrays. Thus, in an embodiment the windings are formed from a transposed conductor. Transposed conductors are multi-strand conductors in which each strand is insulated, and is transposed in order to occupy each possible position along a specific length. The transposition of the strands may be continuous, discrete, or random. In this way, when the conductor is exposed to a magnetic field, each strand will on average link with the same number of flux lines as every other strand, thus dividing current equally among the strands. The strands are of small enough diameter that little skin effect can occur, thereby reducing losses due to induced eddy currents caused by the rotating rotor field.

In an embodiment, the windings are formed from litz conductor. Litz conductors are a particular type of transposed conductor in which strands of round cross-section are transposed continuously along the cable length. Other transposed conductors may be contemplated, such as Roebel conductors which use rectangular strands transposed at discrete intervals.

The transposed conductor may, in an embodiment, be formed of copper. In another embodiment, it may be formed of aluminium.

Figure 4:
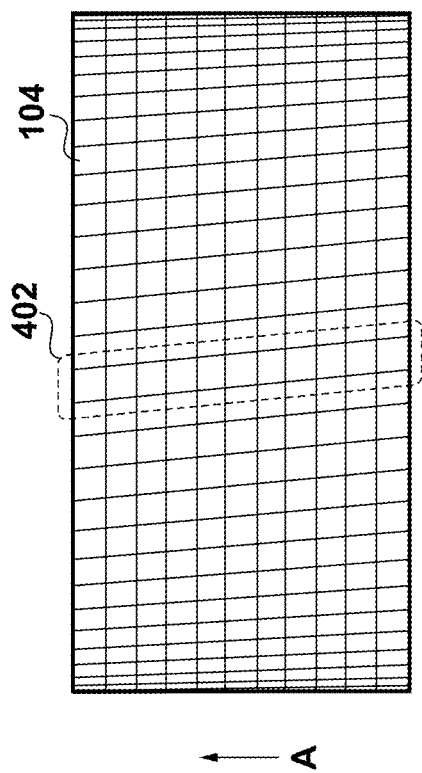
FIG. 4 shows one embodiment of the rotor magnets.

A plan view of an embodiment of the rotor 102 is shown in FIG. 4. The axial direction is shown by arrow A. In this embodiment, the permanent magnets 104 on the rotor 102 are skewed in an axial sense to reduce cogging torque—a group of permanent magnets 104 having the same magnetisation are identified at 402 for clarity. It will be seen that the permanent magnets have a parallelogram shape in this embodiment. Further, as illustrated they may be axially segmented to reduce eddy current losses therein.

Figure 5:
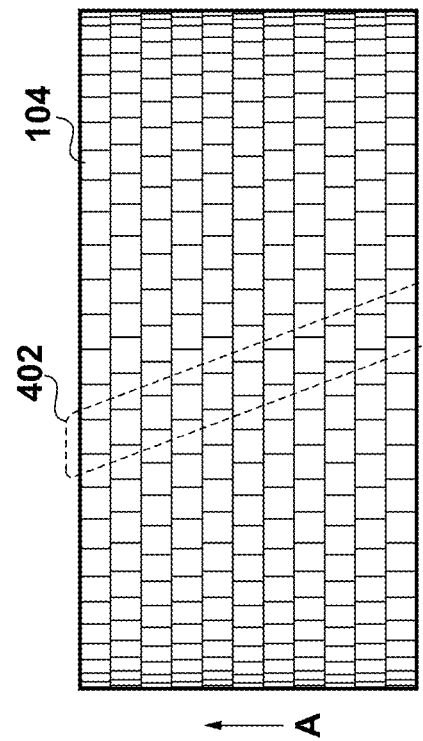
FIG. 5 shows another embodiment of the rotor magnets.

A plan view of another embodiment of the rotor 102 is shown in FIG. 5. In this embodiment, the permanent magnets 104 have a rectangular shape with axial segmentation to reduce eddy current losses. Magnets of the same magnetisation, such as group 402, are circumferentially offset in the axial direction A to again reduce cogging torque. This embodiment may have advantages in terms of cost due to the rectangular shape of the magnets 104.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

We claim:

1. A radial flux rotary electric machine having an exterior-rotor configuration, comprising:
    a permanent-magnet rotor comprising permanent magnets in a Halbach array;
    a stator that is air-cored and disposed in an interior of the rotor, and has: (1) teeth defining slots that are tapered, and (2) distributed windings around the teeth to form coils in a double-layer arrangement, the windings being comprised of a plurality of phase windings; and
    an inner support on which the permanent magnets are mounted abutting each other in a circumferential direction of the stator,
    wherein, for each tooth T having a slot S1 on one side thereof and a slot S2 on another side thereof, a coil side C1 of a phase winding is arranged to occupy a radially inner layer of the slot S1 and a coil side C2 of the same phase winding is arranged to occupy a radially outer layer of the slot S2, and the coil side C1 has a smaller circumferential dimension and a larger radial dimension than the coil side C2.

2. The rotary electric machine of claim 1, in which the windings have a constant conductor cross-sectional area.

3. The rotary electric machine of claim 1, in which the permanent magnets are retained in place by a pre-stressed outer retainer.

4. The rotary electric machine of claim 3, in which the outer retainer is comprised of one or more of:
- a carbon fibre composite;
- a metal matrix composite.

5. The rotary electric machine of claim 1, in which the permanent magnets on the rotor are skewed in an axial sense to reduce cogging torque.

6. The rotary electric machine of claim 1, in which the permanent magnets on the rotor are separated into axial segments, wherein axially adjacent segments have a circumferential offset therebetween to reduce cogging torque.

7. The rotary electric machine of claim 1, in which the windings in the stator comprise a transposed conductor.

8. The rotary electric machine of claim 7, in which the transposed conductor is a litz conductor.

9. The rotary electric machine of claim 1, in which the coil side C1 and the coil side C2 are connected in series.

10. The rotary electric machine of claim 1, in which the coil side C1 and the coil side C2 are connected in parallel.

\* \* \* \* \*